Dec. 3, 1940.    H. C. A. POTEZ    2,223,703
AUXILIARY SERVICE PLANT FOR AIRCRAFT
Filed May 13, 1939    4 Sheets-Sheet 1
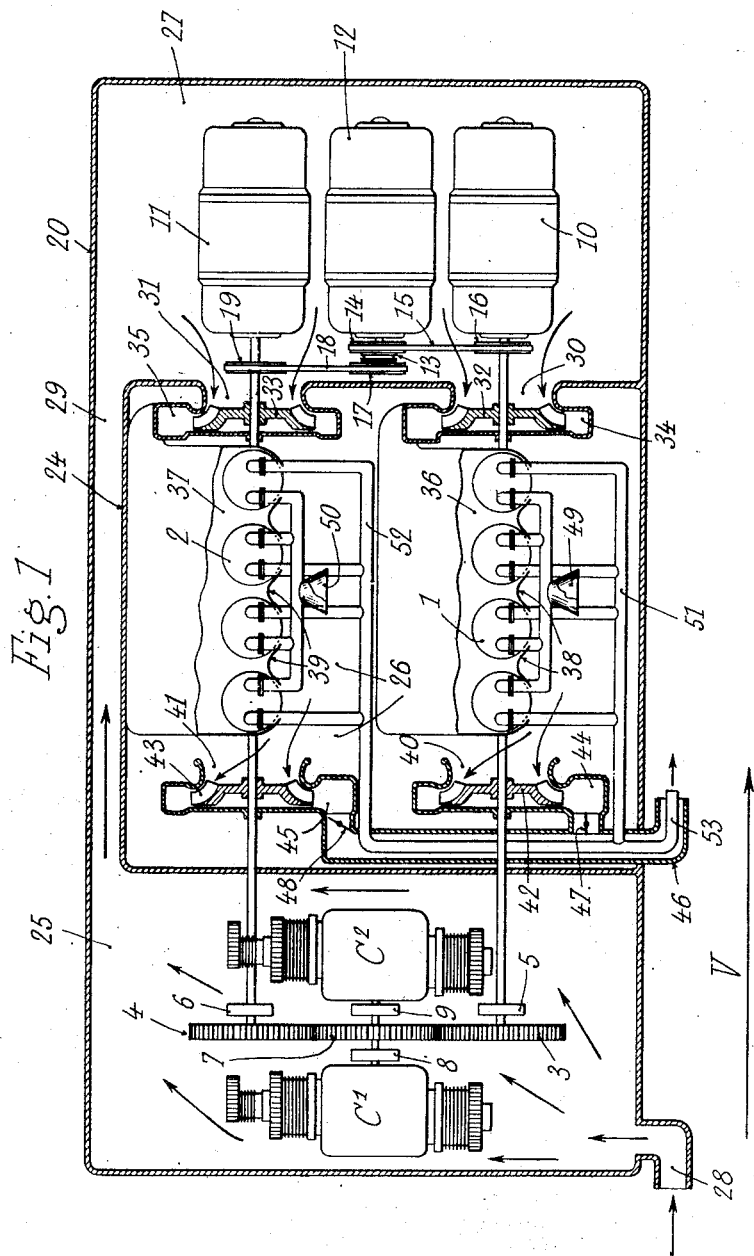
Inventor,
H. C. A. Potez
By Glascock Downing & Seebold
Attys.

Dec. 3, 1940.  H. C. A. POTEZ  2,223,703
AUXILIARY SERVICE PLANT FOR AIRCRAFT
Filed May 13, 1939  4 Sheets-Sheet 2
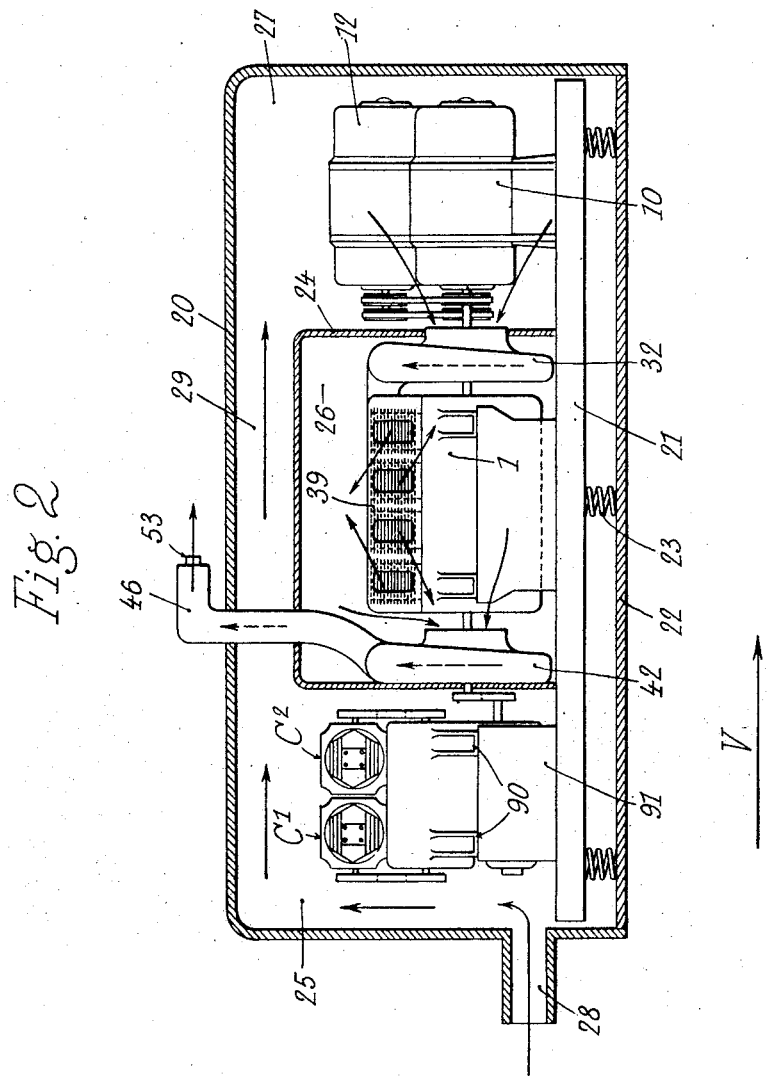
Inventor,
H. C. A. Potez
By Glascock Downing Seebold

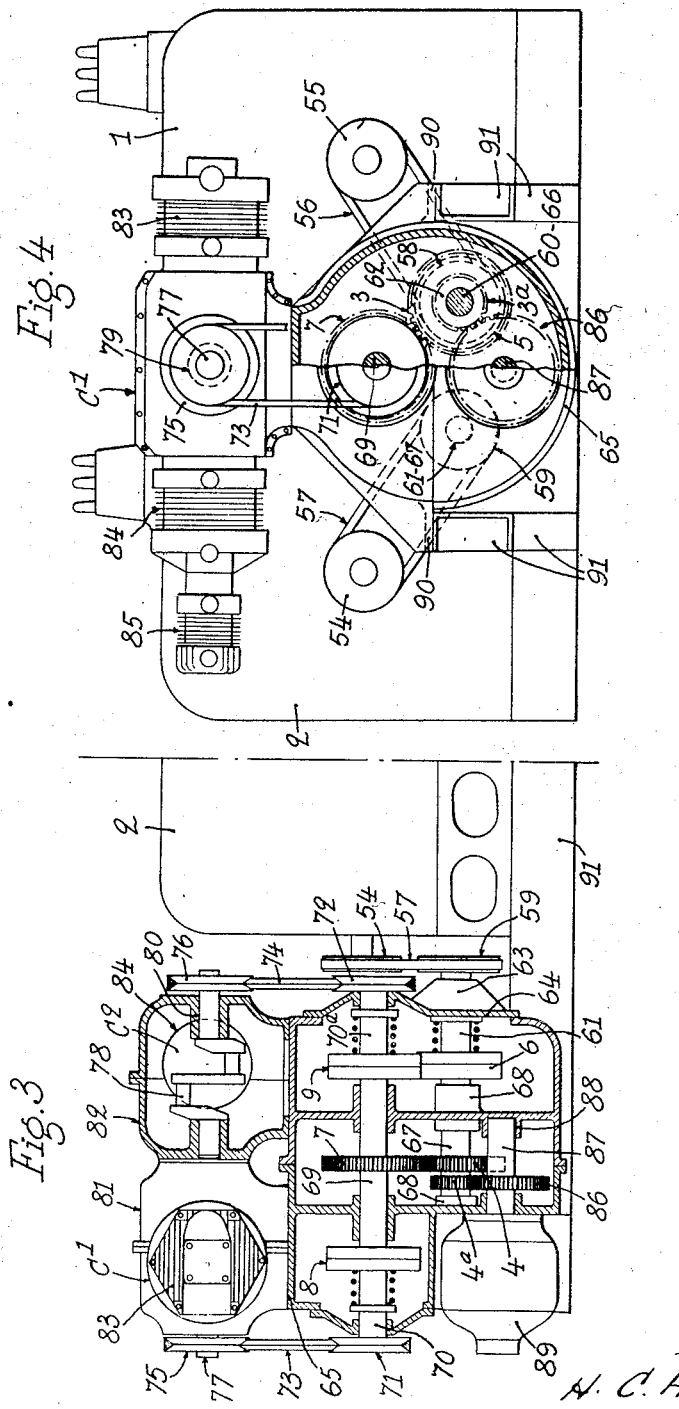

Dec. 3, 1940.	H. C. A. POTEZ	2,223,703
AUXILIARY SERVICE PLANT FOR AIRCRAFT
Filed May 13, 1939	4 Sheets-Sheet 4

Inventor,
H. C. H. Potez
By: Glascock Downing & Seebold
Attys.

Patented Dec. 3, 1940

2,223,703

UNITED STATES PATENT OFFICE 2,223,703

AUXILIARY SERVICE PLANT FOR AIRCRAFT

Henry Charles Alexandre Potez, Meaulte, Somme, France

Application May 13, 1939, Serial No. 273,590
In France June 24, 1938

8 Claims. (Cl. 290—4)

It is known that on board of modern aircraft there exists a great number of auxiliary devices of a most varied nature, such as a starting compressor, vacuum pumps, defrosting pumps, hydraulic pumps, generators, and the like. Such devices are operated by the engine or engines used for the flying of the aircraft. However, on board of heavy-multi-engined aircraft, in order to prevent the stopping of an engine from causing stopping of the auxiliary devices, such devices are mounted upon all the engines, or at least their operation is insured when only the minimum number of engines necessary for the sustentation of the aircraft are in operation. Moreover, in view of the constantly-increasing distance of the engines from the fuselage, it is necessary, in order to connect the auxiliary devices with the instruments, to employ a great length of piping.

In order to obviate such drawbacks, use has been made of independent plants adapted to drive the generators and the starting compressors. It was then proposed to add to these all the other auxiliary devices on board. However, this leads to a very complex aggregate of parts including the hydraulic pumps, a group of vacuum pumps for the defrosting, the apparatus for blind flying, a high-pressure compressor for starting, the extinguisher, the stored supply of compressed air, a mean-pressure compressor for the automatic piloting, and the generators.

The present invention has for its object to provide a central plant for aircraft including the auxiliary devices on board which are actuated by one or more auxiliary engines independent of the main engine or engines serving for the flight.

According to the invention and in order to obtain complete safety, there are provided two separate engines adapted to drive one or more compressors as well as the generators and the hydraulic pumps, the whole plant being preferably arranged in order to provide, by suitable couplings and uncouplings, for the driving, by either one or both of the engines, of any one of the compressors or of several at the same time, and of the generators and the hydraulic pump or pumps.

In a preferred embodiment, the compressor or each compressor comprises two horizontal oppositely disposed cylinders and a third and smaller cylinder which constitutes a second stage of compression and is in line with one of the two cylinders aforesaid.

According to a further feature, each compressor fulfils one, several, or all of the following functions: the filling of a high-pressure tank for the storage of compressed air; the supply of a mean-pressure tank which is substituted for the usual compressor for the automatic piloting; the supply of a low-pressure tank which is substituted for the several usual pumps for defrosting purposes; the supply of a vacuum tank which is substituted for the several usual vacuum pumps for the blind flying apparatus; direct starting with compressed carburetted air.

Further characteristics will be set forth in the following description.

In the accompanying drawings, which are given solely by way of example:

Fig. 1 is a diagrammatic plan view of a plant in conformity with the invention, consisting of the combination of two engines with two compressors and three generators, which plant is contained in a sound-proof casing adapted to dampen the noise of the engines.

Fig. 2 is a side diagrammatic view of the said plant mounted in the sound-proof casing.

Figs. 3 and 4 are a side view and an end view, with parts broken away, of an embodiment of the driving means of two compressors and a hydraulic pump.

Figure 5:
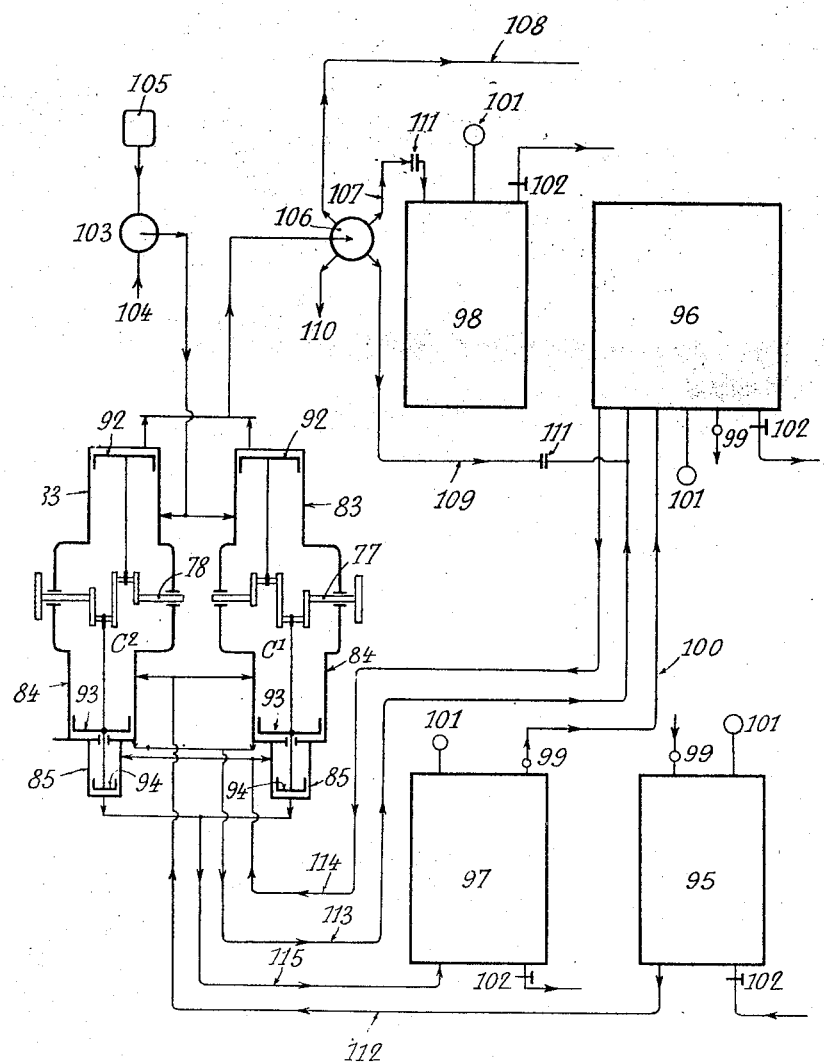
Fig. 5 is a diagram showing the combination of two compressors with the above-mentioned tanks and the corresponding piping.

In the diagrams shown in Figs. 1 and 2, the plant comprises two engines 1 and 2 having for example four cylinders each and adapted to drive respectively the gear-wheels 3 and 4 through suitable transmissions comprising clutches 5 and 6. The wheels 3 and 4 engage a gear-wheel 7 so that they may have the same direction of rotation although they are connected together. Two compressors $C^1$ and $C^2$ are driven by the wheel 7 through transmissions comprising clutches 8 and 9.

At their other ends, the engines 1 and 2 drive respectively two electric generators 10 and 11. A third generator 12 can be driven by either one of the first two generators, by means of a jaw-clutch 13 or the like which may connect the shaft of the generator 12 either with a pulley 14 driven by a belt 15 mounted on a pulley 16 secured to the shaft of the generator 10, or with a pulley 17 driven by a belt mounted on a pulley 19 secured to the shaft of the generator 11.

In order to dampen the noise of the engines 1 and 2, the entire plant is mounted in a casing or housing 20 consisting of sound-proof material. The plant is secured to a frame 21 (Fig. 2) which is connected with the bottom 22 of said casing by an elastic suspension device consisting of suitable parts such as springs 23. Moreover, the engines 1 and 2 are contained in a cowling 24. In this manner, the whole apparatus is divided into three tight compartments: a pumping compartment 25 containing the compressors C$^1$ and C$^2$ and the hydraulic pump or pumps, an engine compartment 26 containing the two internal combustion engines 1 and 2 for driving the plant and a compartment 27 for electric outfit which contains the three generators 10, 11 and 12.

The arrangement of the engines 1 and 2 under the cowling and in the casing 26 makes it necessary to provide a cooling device which is particularly effective.

For this purpose, the pumping compartment 25 is connected with the atmosphere by a sleeve 28 which may be mounted in the direction of travel of the aircraft in order to receive the relative wind V. A passage 29 connects the compartment 25 with the electric outfit compartment 27. This latter compartment is in communication with the inlet parts 30 and 31 of two blowers 32 and 33. The delivery chambers 35 and 36 of these blowers are connected respectively with spaces 36 and 37 which are closed on one side by the cylinders of the engines 1 and 2 and by suitable deflectors 38 and 39 which leave a passage towards the engine compartment 36. This latter compartment is connected with the suction inlets 40 and 41 of suction fans 42 and 43, whose outlets 44 and 45 are connected with the atmosphere by a sleeve 46 whose opening is placed in the contrary direction to the travel in order to provide for a suction by the relative wind V.

Throttle-valves 47 and 48, mounted in the outlets of suction fans 42 and 43, serve to cut off these latter when the corresponding engine 1 or 2 is stopped.

The suction inlets 49 and 50 of the two engines 1 and 2 are located in the compartment 26. This compartment contains air which has been heated by its passage over the engine cylinders and at high altitudes, the carburetors of the engines are then supplied with warm air. The exhaust conduits 51 and 52 of the two engines 1 and 2 are connected with a conduit 53 mounted in the sleeve 46, whereby a depression is created at the exhaust which furthers the discharge of the burnt gas through the conduit 53.

The operation of the device described is as follows. When the engine 1 is running, the clutch 5 is thrown in to drive the wheel 3 which in turn drives the wheel 4 by means of the wheel 7; the clutch 6 must be disengaged in order that the engine 2, which is stopped, shall not be driven. Any device can be provided to prevent the coupling of the clutch 6 when the contact of the engine 2 is cut off, as well as to prevent the coupling of the clutch 5 when the contact of the engine 1 is cut off. This allows of driving the compressor C$^1$ or the compressor C$^2$, or both at the same time, by coupling the clutch 8 or the clutch 9, or both together. In like manner, if the engine 2 is running and the engine 1 stopped, with clutch 6 thrown in and clutch 5 thrown off, the compressors C$^1$ and C$^2$ can be driven at the same time or separately, by means of the clutches 8 and 9. The engines 1 and 2 can also be used at the same time. (It should be noted that a like arrangement can be employed for any number of engines).

The cooling is insured by the blowers 32 and 33 and the suction fans 42 and 43, which are driven respectively by the engines 1 and 2. The cooling air enters at 28 into the pumping compartment 25 where it cools the compressors C$^1$ and C$^2$, it then proceeds through the passage 29 into the compartment 27 in which it cools the generators 10, 11 and 12, and is then withdrawn at 30 and 31 by the blowers 32 and 33 which deliver it into the spaces 36 and 37, and passes thence between the deflectors 38 and 39 and the cylinders of the engines 1 and 2, thus cooling these latter. The air is now contained in the engine compartment 26, from which it is withdrawn, on the one hand by the suction inlets 49 and 50 of the engines 1 and 2, and on the other hand by the suction fans 42 and 43 which discharge it into the atmosphere through the sleeve 46. If one of the engines were stopped, the corresponding throttle valve 47 or 48 will be closed in order to prevent a part of the air from being circulated on a closed circuit through 36, 44, 45, 41 and 36, or inversely, according as the engine 1 or the engine 2 is stopped.

Figs. 3 and 4 are detail views showing a preferred embodiment of the connections between the engines and the compressors C$^1$, C$^2$. In this embodiment, the engines 1 and 2 drive respectively pulleys 54 and 55, which in turn drive through belts 56 and 57 and pulleys 58 and 59 the shafts 60 and 61 journalled in bearings 62 and 63 of a cover 64 mounted on the casing or gear-box 65. The driving parts of the clutches 5 and 6 are secured to the shafts 60 and 61 and actuate the driven parts which are secured to shafts 66 and 67 journalled in bearings 68 of the casing 65, and to which are respectively secured the pinions 3 and 3$^a$, and 4 and 4$^a$. The pinions 3 and 4 engage the pinion 7 secured to a shaft 69 journalled in bearings carried by the casing 65 and which drives respectively through the clutches 8 and 9 and shafts 70 and 70$^a$ the pulleys 71 and 72 which are connected by belts 73 and 74 with pulleys 75 and 76 mounted on the crankshafts 77 and 78 of the compressors C$^1$ and C$^2$, respectively. The said crankshafts 77 and 78 are rotatable respectively in bearings 79 and 80 on the casings 81 and 82 of the compressors C$^1$ and C$^2$ which are mounted on the casing 65. Upon the said casings 81 and 82 are mounted horizontally and in the opposite position the cylinders 83 and 84, a small cylinder 85 being mounted on the cylinder-heads of the cylinders 84 in line with the same and in the horizontal position. The cylinders 83 and 84 are oppositely situated, and their pistons are driven by a crankshaft having two crank-pins spaced at 180°, but any other arrangement of cylinders and crank-pins can be employed, although the present arrangement is the best as concerns the balancing. The piston of the cylinder 85 is connected with the piston of the cylinder 84 and follows it in its movements, the connection being such that the lateral reactions of this latter piston will not be imparted to the piston of the cylinder 85 with which it is connected.

The pinions 3$^a$ and 4$^a$ engage a gear-wheel 86 which is keyed to a shaft 87 rotatable in bearings 88 secured to the casing 65, and drives the hydraulic pump 89 which may serve for the actuation of the retraction jacks of the landing gear.

Lugs 90 serve to secure the casing or gear-box 65 to the frame 91.

The compressors C$^1$ and C$^2$ are preferably combined, as shown in Fig. 5, with:

A vacuum tank 95 which is substituted for the vacuum pumps for the actuation of the blind flying apparatus;

A low-pressure tank 96 supplying the defrosting circuits;

A mean-pressure tank 97 for the requirements of the automatic piloting device.

A high-pressure tank 98 which serves as a storage supply of compressed air.

Regulating valves 99 are mounted on the tanks 95, 96 and 97. The valve of the tank 97 can deliver into the tank 96 through a conduit 100, but this is not obligatory. Each tank is provided with a pressure-gauge 101 and a valve 102 for intake and offtake.

Both compressors C¹ and C² are connected in parallel with these tanks. The suction inlet of the cylinder 83 of each compressor is connected with a distributer 103 which provides for withdrawal from the atmosphere at 104, or through a carbureter 105. Its discharge outlet is connected with a distributer 106 by which compressed air can be circulated into the high-pressure tank 98 through the conduit 107, or into the starting distributer through 108, or into the low-pressure tank 96 through the conduit 109, or to the atmosphere outlet at 110. Check-valves 111 are mounted on the said conduits 107 and 109.

The suction of each cylinder 84 takes place through the vacuum tank 95 through the conduit 112, and the discharge outlet of each cylinder 84 is connected with the low-pressure tank 96 through the conduit 113.

Each cylinder 85 withdraws in the tank 96 through the conduit 114, and discharges into the mean-pressure tank 97 through the conduit 115.

The operation of the device is as follows. The pistons of the cylinders 83, 84, 85 are driven by the crankshaft 77 or 78. When it is desired to start the engines for the propulsion of the aircraft, the distributer 103 provides for the suction of air through the starting carbureter 105, and the cylinder 83 of either one or both of the compressors will discharge this carburetted air into the starting circuit, through the distributer 106 and the conduit 108.

For defrosting purposes, the distributer 103 is turned for connection with the atmosphere at 104. The cylinder 83 thus withdraws at atmosphere pressure and discharges through the distributer 106 into the low-pressure tank 96; the cylinder 84 also discharges into the tank 96 and withdraws air from the vacuum tank 95, thus producing a constant vacuum in the latter, owing to the valve 101. This vacuum may serve for the actuation of the blind flying apparatus when the corresponding valve 102 is open. When the valve 102 of the tank 96 is open, the defrosting circuit can be supplied. If the output is excessive, or if the valve 102 of this tank is closed and no defrosting action is required, the distributer 106 permits of connecting the discharge outlet of the cylinder 83 with the atmosphere at 110.

In order to operate the automatic piloting device, this is effected by opening the cock 102 of the mean-pressure tank 97 which is supplied by the discharge from the cylinder 85 which withdraws from the low-pressure tank 96. When the valve 102 of the tank 97 is closed, the valve 99 of this tank will open, and thus the air in the tank 97 will expand and will flow into the low-pressure tank 96.

Finally, when it is desired to set the storage tank 98 under pressure, the discharge from the cylinder 83 is connected with this tank by the distributer 106, the distributer 103 being still connected with the atmosphere for the suction.

Obviously, the said invention is not limited to the embodiments herein described and represented, which are given solely by way of example.

Having now described my invention, what I claim as new and desire to secure by Letters Patent is:

1. In a central plant for auxiliary services on board of aircraft, the combination of two independent internal combustion engines, at least two air compressors, electric generators, at least one hydraulic pump, and means for operatively connecting in a selective manner either one or both of said engines to either one or both of said air compressors, to said electric generators and to said hydraulic pump.

2. In a central plant for auxiliary services on board of aircraft, the combination of two internal combusion engines, two gear-wheels, separate driving connections between each of said engines and one of said gear-wheels, respectively, each of said driving connections including a clutch having a driving member operatively connected to the respective engine and a driven member operatively connected to said gear-wheel, a toothed pinion meshing with both gear-wheels, two air compressors, and separate transmission means between said toothed pinion and each of said compressors and including a clutch having a driving member operatively connected to said pinion and a driven member operatively connected to the respective compressor.

3. A plant as claimed in claim 2, further comprising two other gear-wheels each of which is mounted coaxially with and is connected in rotation to one of said first-mentioned gear-wheels, respectively, a second toothed pinion meshing with both of said other gear-wheels and a hydraulic pump driven by said second pinion.

4. In a central plant for auxiliary services on board of aircraft, the combination of two electric generators, an internal combustion engine combined with each electric generator for driving same, a third electric generator, and means for selectively coupling said third generator to either one of said two first mentioned generators.

5. A central plant for auxiliary services on board of aircraft comprising auxiliary service devices including two air compressors, electric generators, and a hydraulic pump, internal combustion engines for driving said auxiliary service devices, and a sound-proof casing enclosing said auxiliary service devices and said internal combustion engines, said auxiliary service devices and said internal combustion engines being supported elastically within said casing which is provided with an inlet for cooling air and with an outlet for this air.

6. A central plant for auxiliary services on board of aircraft, comprising air and hydraulic pumps, electric generators and internal combustion engines for driving said pumps and said generators, a common casing enclosing all the above-mentioned parts, partitions in said casing for dividing the latter into three compartments, a first compartment containing the pumps, a second compartment containing said generators and a third compartment containing said engines, said first compartment being provided with an air inlet which is open to the atmosphere in the direction of travel of the aircraft, a passage connecting said first compartment with said second compartment, engine-driven blowers withdrawing air from said second compartment and discharging it into said third compartment onto the hot parts of said engines for cooling same and suction fans withdrawing air from said third compartment and discharging into the atmosphere outside of said casing.

7. A plant as claimed in claim 6, in which said engines have a plurality of cylinders arranged in rows and further comprising means for guiding the air discharged by said blowers across said rows of cylinders.

8. A plant as claimed in claim 6, in which each of said suction fans is provided with a valve for throttling the discharge.

HENRY CHARLES ALEXANDRE POTEZ.